Aug. 1, 1967 R. B. BADGETT 3,333,687

TAPE SUPPLY CABINET

Filed July 6, 1965 2 Sheets-Sheet 1

INVENTOR
ROGER B. BADGETT

BY R. C. Terry

ATTORNEY

Aug. 1, 1967 R. B. BADGETT 3,333,687

TAPE SUPPLY CABINET

Filed July 6, 1965 2 Sheets-Sheet 2

United States Patent Office 3,333,687

Patented Aug. 1, 1967

3,333,687

TAPE SUPPLY CABINET

Roger B. Badgett, Northlake, Ill., assignor to Teletype Corporation, Skokie, Ill., a corporation of Delaware Filed July 6, 1965, Ser. No. 469,520

12 Claims. (Cl. 206—52)

ABSTRACT OF THE DISCLOSURE

A tape supply cabinet including a door supported on a pair of spring loaded pins which engage different sets of cooperating holes in the cabinet to position the door in different positions with respect to the cabinet.

This invention relates to a tape supply cabinet and more particularly to a tape supply cabinet having a door positionable in at least two positions with respect to the cabinet.

Recently the telegraph industry has begun a transition away from the use of conventional five-unit codes which may be recorded on relatively narrow tapes and toward the use of codes employing as many as eight units which require relatively wide tapes. This transition has resulted in many pieces of telegraph apparatus being equipped to handle more than one distinct code. Accordingly, it is necessary that the tape supply equipment which supplies tape to such apparatus be able to accept tapes of various widths and to present such tapes in an accurate and uniform manner.

Accordingly, an object of this invention is to provide a closure device for enclosing articles of various predetermined widths.

Another object of this invention is to provide a tape supply cabinet which is capable of accepting tapes of various widths and which presents such tapes in a uniform manner to tape utilization equipment.

A further object of this invention is to provide a new and improved door mounting mechanism for a tape supply cabinet.

According to the preferred embodiment of the invention these and other objects are achieved by providing a tape supply cabinet in which the door of the cabinet may be mounted at various predetermined locations with respect to the remainder of the housing, these positions accommodating tapes of various predetermined widths. The door is used to constrain rolls of tape enclosed by the cabinet from axial movement with respect thereto and accordingly is used to uniformly control the positioning of rolls of tape of different widths.

A more complete understanding of the invention may be had by referring to the following detailed description when taken in conjunction with the accompanying drawings wherein.

Figures 1, 2, 3:
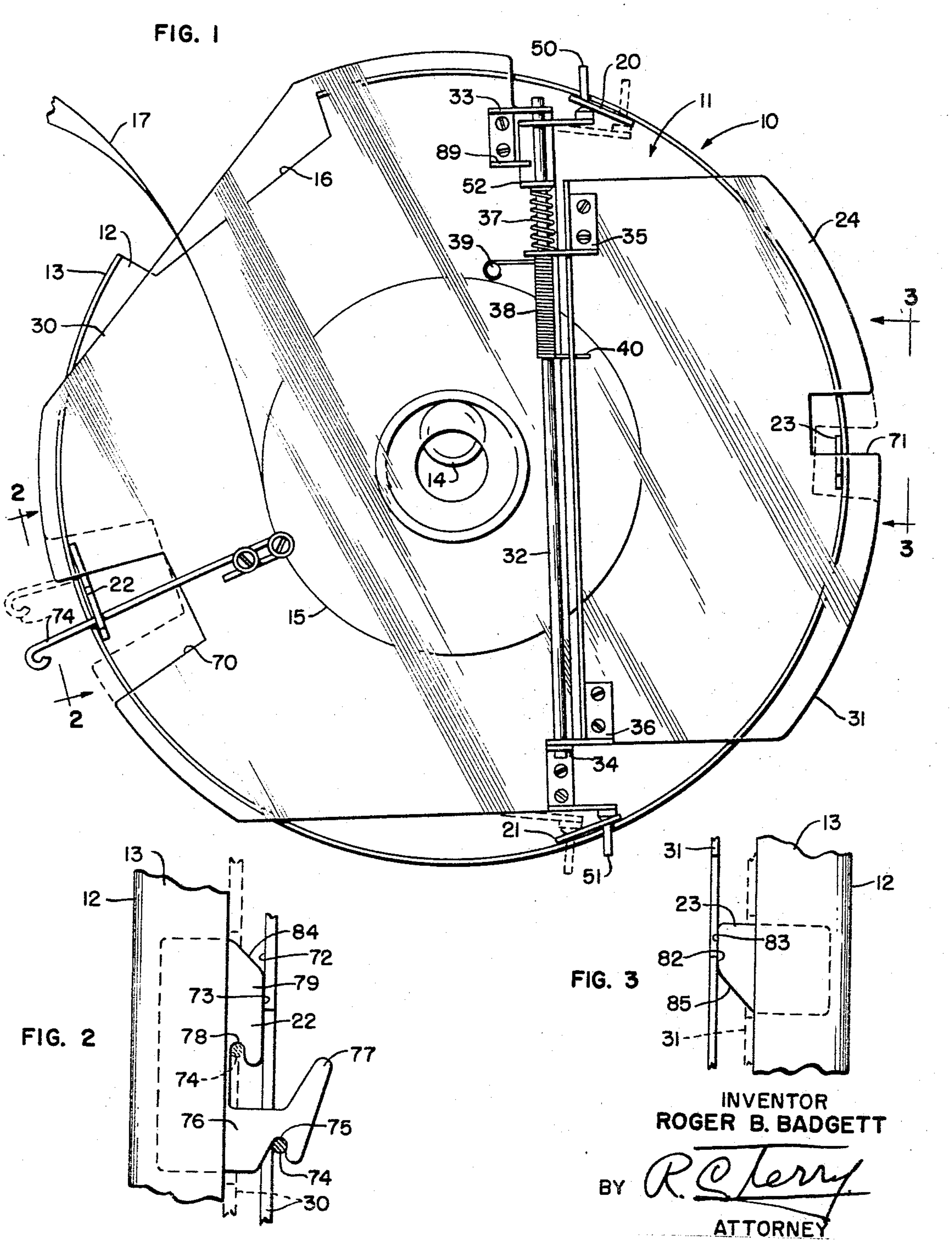
FIG. 1 is a front view of a tape supply cabinet employing the invention.
FIG. 2 is an enlarged partial side view taken along the line 2—2 in FIG. 1 in the direction of the arrows.
FIG. 3 is an enlarged partial side view taken along the line 3—3 in FIG. 1 in the direction of the arrows.
Figure 4:
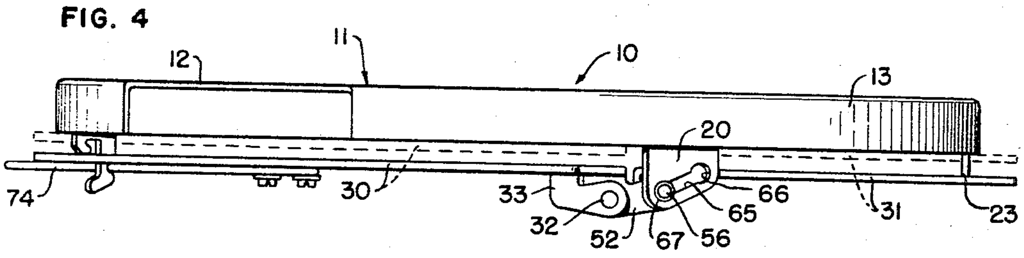
FIGS. 4 and 5 are top views showing the door of the tape supply cabinet in various positions.

Referring now to the drawings, wherein like reference numerals designate like parts throughout the several views, with particular reference being had to FIGS. 1 and 4, there will be seen a tape supply cabinet 10. The cabinet 10 includes a housing or frame member 11 which serves as a frame for the device and which is comprised of a rear wall 12 and a flange 13 that surrounds substantially all of the rear wall 12. Mounted at approximately the center of the wall 12 is a centilever post 14 upon which may be mounted a roll of tape 15 to be unwound.

The rear wall 12 serves as a locating surface for the roll of tape 15 and the rear wall 12 and the flange 13 serve to enclose the roll of tape 15 on three sides. The rear wall 12 and flange 13 are cut away to form an opening 16 so that the leading end 17 of the roll of tape 15 may be threaded out of the tape supply cabinet 10 and may be fed into a tape utilization device (not shown). If the roll of tape 15 is of large size a suitable tape pulling device, such as the device disclosed in the copending application of R. B. Badgett filed Jan. 27, 1965, Ser. No. 428,346, may be employed to assist the tape utilization device in unwiding the roll of tape 15.

Attached to the flange 13 are a pair of support members 20 and 21 (FIG. 1) and a pair of locating members 22 and 23. A substantially circular cover plate or door 24 is provided for enclosing the roll of tape 15 on its side which is not enclosed by the rear wall 12 and the flange 13 of the housing member 11. The door is supported by the support members 20 and 21 and is positioned with respect to the housing member 11 by the locating members 22 and 23.

The door 24 as shown in the drawings is comprised of a left closure member 30 and a right closure member 31, both of which are located on and supported by a rod 32 which is chordally mounted with respect to the housing member 11. The left member 30 is attached to the rod 32 by means of bracket members 33 and 34 which serve to prevent the left member 30 from moving axially with respect to the rod 32. The right member 31 of the door 24 is pivotally attached to the rod 32 by means of a bracket member 35, which is positioned between a compression spring 37 and a torsion spring 38, and a bracket member 36 which rests on bracket 34. Torsion spring 38 is attached to a pin 39 on the left member 30 and has a projection 40 which is engaged with right member 31 of door 24. The torsion spring 38 urges the right member 31 to pivot counterclockwise (FIG. 4) about the rod 32 and accordingly, urges right member 31 toward the locating member 23 and the housing member 11.

The entire door 24 is supported on the housing member 11 by a pair of hinge pins or trunnions 50 and 51. Hinge pin 51 is attached to bracket member 34 which is in turn attached to left member 30 of the door 24. Hinge pin 50 is mounted on a bracket 52 which is slidably mounted on the rod 32 and which is urged upwardly (FIG. 1) on the rod 32 by the compression spring 37.

Figures 5, 6, 7, 8:
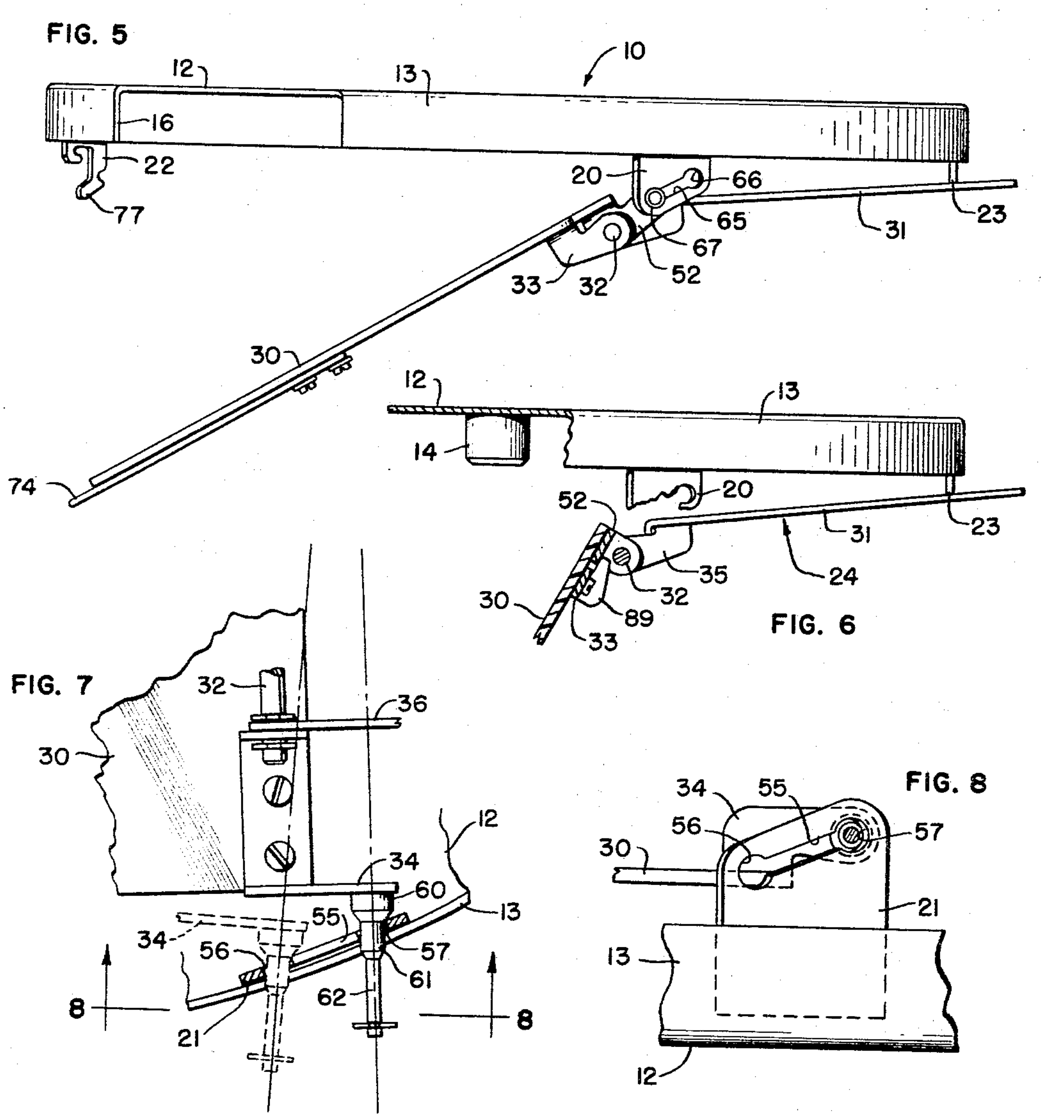
FIG. 6 is a partial top view in which certain parts have been broken away more clearly to illustrate certain features of the invention.
FIG. 7 is an enlarged partial front view showing the details of one of the hinge pin assemblies.
FIG. 8 is an enlarged partial bottom view taken along the line 8—8 in FIG. 7 in the direction of the arrows.

Referring to FIGS. 7 and 8 the details of the mounting arrangement for the door member 24 will be more fully set forth. In those figures the construction of the support member 21 and the hinge pin 51 are shown in detail. It should be understood that the construction of support member 20 and the hinge pin 50 is similar to the construction of the members 21 and 51 shown in FIGS. 7 and 8 and is exactly like that construction except for insignificant details.

As is shown in FIG. 8 there is formed in the support member 21 a guiding slot 55 which terminates in locating holes 56 and 57. This guiding slot is formed at an angle with respect to the housing member 11 and when the circular configuration of the housing member 11 is considered it will be noted that the guiding slot 55 actually forms a small portion of a helix with respect to the housing member 11. Accordingly, the locating holes 56 and 57 are helically offset one from the other.

The hinge pin 51 is formed in three sections which may be differentiated from each other by their diameter. The uppermost portion 60 of the pin 51 has a large diameter, that is, it has a diameter which is too large to enter either the guiding slot 55 or either of the locating holes 56 and 57. The middle portion 61 of the pin 51 has a diameter which is too large to enter the guide slot 55 but which has a suitable cross section so that it may be accurately located by either of the locating holes 56 and 57. The lowermost portion 62 of the pin 51 is reduced in diameter and is suitably dimensioned so that it will slide in the guide slot 55. The support member 20 and the hinge pin 50 are constructed similarly to the support member 21 and the pin 51 in that the pin 50 has an upper reduced section, a middle section and a lower enlarged section and in that a guiding slot 65, an inner locating hole 66 and an outer locating holes 67 are formed in the support member 20.

With the left-hand closure member 30 in the position shown in FIG. 5, the door 24 may be positioned in either of two positions relative to the housing member by moving the hinge pins from one locating hole in their respective support members to the other. When it is desired to change the positioning of the door 24, the bracket 52, to which the hinge pin 50 is attached, is pushed downwardly against the action of compression spring 37. This brings a reduced portion of the trunnion or hinge pin 50 similar to the reduced portion 62 of the pin 51 into alignment with the guiding slot 65 of the support member 20. The pin 50 is then moved in the guiding slot 65 and is brought into engagement with the innermost locating hole 66 of the bracket 20. The bracket 52 is then released and the middle portion of the pin 50 becomes engaged with the innermost locating hole 66 of the support member 20.

At this time the hinge pin 50 will be engaged with the innermost locating hole 66 of the support member 20 while the trunnion or hinge pin 51 will be engaged with the outermost locating holes 57 of the support member 21. To move the pin 51 to the innermost locating hole 56 of the support member 21 it is only necessary to grasp the bracket member 34 and to raise it so that the reduced portion 62 of the pin 61 can enter the guiding slot 55 of the support member 21. The raising of the bracket 34 will cause the bracket 36 on the right portion 31 of the bracket 34 to be raised and since the bracket 36 and the bracket 35 are rigidly attached to the right portion 31, this will cause the bracket 35 to be raised against the action of the compression spring 37. After the reduced portion 62 of the pin 51 has been engaged with the slot 55 the pin 51 is moved to bring its reduced portion 62 into the innermost locating hole 56 of the support member 21. The bracket 34 is then lowered thereby bringing the middle portion 61 of the pin 51 into engagement with the innermost locating hole 56 of the support member 21. At this time the circular cover plate or door 24 will be positioned in its inward position; that is, in the position shown in the dotted lines throughout the drawings.

Referring now to FIG. 1 it will be seen that there is a notch 70 formed in the left member 30 of door 24 and that similarly formed in the right member 31 is a notch 71. In FIG. 1 the full line drawing depicts the door 24 in its outward position, that is, in the position corresponding to the positioning of the hinge pins 50 and 51 in the outermost locating holes 57 and 67 of the supporting members 20 and 21. In this position a locating surface 72 on the left member 30 of the door 24 is in engagement with a locating surface 73 on the locating member 22. The locating member 22, therefore, serves to restrain the left member 30 from movement toward the rear wall 12 of the housing member 11 a sufficient distance to allow the left member 30 to pinch the roll of tape

15. A slightly resilient latch member 74 is attached to the left closure member 30 and this latch member is engageable with a notch 75 formed in a lower portion 76 of the locating member 22 to constrain the left member 30 from being accidentally opened against the action of the torsion spring 38. An upstanding finger 77 of the lower member 76 prevents the latch member 74 from being positioned in engagement with a notch 78 which is formed in the upper portion 79 of the locating member 22.

As is shown in FIG. 3 the positioning of the hinge pins 50 and 51 in the outermost locating holes 57 and 67 formed in the support members 20 and 21 brings a locating surface 82 of the right closure member 31 into engagement with a locating surface 83 formed on the locating member 23. The locating member 23, therefore, serves to prevent the right member 31 from pinching a roll of tape 15 which is mounted on the cantilever post 14.

Since the locating holes in the brackets 20 and 21 are offset from each other helically with respect to the housing member 11, the movement of the pins 50 and 51 into the innermost locating holes 56 and 66 or the support members 20 and 21, that is, into the position shown in dotted lines in the drawing, will cause the door 24 to rock slightly in a clockwise direction with respect to the housing member 11. The rocking movement of the door 24 will bring the notches 70 and 71 into alignment with the locating members 22 and 23. Since the locating surfaces 72 and 82 on the left member 30 and the right member 31, respectively, will no longer be positioned in engagement with the locating surfaces 73 and 83 on the locating members 22 and 23, respectively, the left member 30 and the right member 31, will be driven by the torsion spring 38 into engagement with the flange 13 of the housing member 11. The outermost edge of the flange 13 is positioned suitably with respect to the rear wall 12 of the housing member 11 to act as a locating surface for engagement with the locating surfaces 72 and 82 on the left member 30 and the right member 31, respectively, and to thereby prevent the torsion spring 38 from driving the members 30 and 31 into pinching engagement with roll 15 on a post 14. The locating surfaces 73 and 83 are offset from the flange 13 an amount equal to the spacing of the locating holes in the support members 20 and 21 to each other so that when the hinge pins 50 and 51 are moved into the innermost locating holes the positioning of the locating surfaces 72 and 82 on the members 30 and 31 will be changed an amount equal to the amount of change in the positioning of the hinge pins 50 and 51. Accordingly, the component parts of the cover plate or door 24 will remain in the same relationship with respect to each other regardless of whether the door is positioned inwardly or outwardly of the housing member 11.

When the door 24 is moved to the position shown in dotted lines in the drawings the latch member 74 is moved by the movement of the door 24 to a suitable position to engage the notch 78 in the uppermost portion 79 of the locating member 22 and, upon engagement with the notch 78, to serve to restrain the door from opening. The upwardly extending finger 77 of the lowermost portion 76 of the member 22 prevents the latch member 74 from being engaged with the notch 75 of the lowermost portion 76.

When the pins 50 and 51 are moved from their outward position (solid lines in the drawings) to their inward position (dashed lines in the drawings) the locating surfaces 72 and 82 fall off of the support members 22 and 23. However, when the hinge pins 50 and 51 are moved back to their outermost positions it is necessary to move the locating surfaces 72 and 82 outwardly and onto locating surfaces 73 and 83 of locating members 22 and 23, respectively. Accordingly, the locating member 22 has an inclined camming surface 84 and the locating member 23 has a similar camming surface 85. These surfaces 84 serve as inclined ramps for the left member 30 and the right member 31 of the door 24 and cause these members to ride up onto the locating surfaces 73 and 83 of the locating members 22 and 23 when the door is moved from its inward to its outward position.

The locating holes are helically arranged with respect to each other so that the positioning of the pins 50 and 51 in different locating holes will vary the positioning of the door 24 with respect to the housing member 11. This difference in positioning allows rolls of tape 15 of different widths to be placed inside the door 24 and still be accurately positioned by the door 24 with respect to the rear wall 12 of the housing member 11. Accordingly, the offset positioning of the locating holes 56, 57, 66 and 67 in the support members 20 and 21 must be of a predetermined amount so that when the door 24 is positioned with the pins 50 and 51 in engagement with the innermost locating holes 56 and 66, the door 24 will be positioned at a predetermined distance with respect to the rear wall 12 of the housing member 11. A roll of tape 15 of a suitable predetermined width will then be positioned properly by the door with respect to the wall 12. Similarly, the outer locating holes 57 and 67 in the support members 20 and 21 must be positioned so that the door 24 will be in location to properly position a roll of tape 15 of different width with respect to the rear wall 12.

The door 24 is employed to constrain the movement of a roll of tape 15 from axial movement along the cantilever post 14 and away from the rear wall 12. Accordingly, when it is desired to place a roll of tape on or remove a roll of tape from the post 14, it is necessary to move the portions of door 24 which are adjacent the post 14 away from the post so that there will be sufficient clearance between the post and the door to facilitate the placing of a roll of tape upon the post or the removal of a roll of tape therefrom.

As is best shown in FIG. 6 the bracket 33 which serves to support the left portion 30 of the door 24 on the rod 32 is provided with a lower tab 89 which overlies the bracket 52 upon which the hinge pin 50 is mounted. Further, the hinge pin 51 is attached directly to the bracket 34. Because of the tab 89 on the bracket 33 and the construction of the bracket 34 an opening of the door 24 does not cause the left member 30 to pivot about the rod 32 but instead causes it to pivot about the hinge pins 50 and 51. Since these pins are offset to the right (FIGS. 1, 4, 5 and 6) this pivoting action causes the left member 30 and the rod 32 to shift outwardly and away from the post 14. The right member 31 of the door 24 does pivot on the rod, however, and when the rod 32 is moved outwardly, the right member 31 slides either on the locating surface 83 or the flange 13 depending on whether the door is in its outer or inner position.

The pivot action of the door 24, in being opened, is shown in progressive steps in FIGS. 4, 5 and 6. In FIG. 6 it should be noted that the pivoting action has moved the components of the door a substantial distance away from the stationary parts of the cabinet and accordingly, the movable parts of the door are positioned, upon a full opening of the door, with ample clearance.

What is claimed is:

1. A tape storage cabinet for housing rolls of tape of different predetermined widths including:
a frame for supporting rolls of tape,
a door for constraining rolls of tape which are supported on the frame from movement axially with respect to the frame, and
means for affixing the door to the frame and preventing removal of the door therefrom and for supporting the door in a plurality of predetermined postions with respect to the frame so that rolls of tape of different predetermined widths may be constrained from axial movement with respect to the frame.

2. A tape storage cabinet for housing rolls of tape of different predetermined width including:
a frame for supporting rolls of tape;

a door for constraining rolls of tape which are supported on the frame from movement axially with respect to the frame; and
offset hinge means for moving the door away from the frame when the door is opened so that rolls of tape may be easily placed upon and removed from the frame and for supporting the door in a plurality of predetermined positions with respect to the frame so that rolls of tape of different predetermined widths may be constrained from axial movement with respect to the frame.

3. An adjustable closure device for positioning tape rolls of various widths in a tape dispensing cabinet comprising:
a pair of closure halves consituting, when assembled, a cover plate;
means for hingedly interconnecting said halves;
trunnion means pivotally mounted on and extending parallel to the interconnecting means; and
a pair of brackets extending from the periphery of the cabinet each having trunnion receiving locating holes arcuately and axially displaced from each other to position the closure halves in different axial positions with respect to the cabinet.

4. An adjustable closure device for positioning tape rolls of various widths in a tape dispensing cabinet comprising:
a pair of closure halves of unequal size constituting, when assembled, a substantially circular cover plate;
means disposed in chordal relation to the circular cover plate for hingedly interconnecting said halves;
trunnion means pivotally mounted on and extending parallel to interconnecting means and disposed farther from the center of the circular cover plate than the means for hingedly interconnecting the halves;
a pair of brackets extending from the periphery of the cabinet each having trunnion receiving locating holes arcuately and axially displaced from each other to position the closure halves in different axial positions with respect to the cabinet; and
spring means for urging said trunnions into said notches to hold the halves in spaced relation to the cabinet.

5. An adjustable closure device for positioning tape rolls of various widths in a tape dispensing cabinet comprising:
a pair of closure halves of unequal size constituting, when assembled, a cover plate;
means offset from the center of the cover plate for hingedly interconnecting said halves;
trunnion means pivotally mounted on and extending parallel to the interconnecting means for supporting the cover plate;
a pair of brackets extending from the periphery of the cabinet each having trunnion receiving locating holes arcuately and axially displaced from each other for supporting the closure halves by the trunnion means in different axial positions with respect to the cabinet;
spring means for urging said trunnions into said notches to hold the halves in spaced relation to the cabinet;
spring means for urging the halves toward the cabinet and about the means hingedly interconnecting them; and
bearing surfaces extending from the periphery of the cabinet and arcuately displaced therefrom for restricting the spacing of the halves from the cabinet amounts dependent upon the holes in which the trunnions are disposed.

6. A mechanism for hingedly supporting a door including:
a frame having at least two locating surfaces,
a pair of support members mounted on the frame and each having at least two locating holes formed in them, the locating holes in each of the support members being equally spaced and in opposite angular arrays with respect to the frame, a door having a locating surface formed on its periphery, and
means for supporting the door on the support members and in engagement with equally spaced locating holes in the support members so that the locating surface on the door is in engagement with one of the locating surfaces on the frame and for supporting the door on the support members and in engagement with different equally spaced locating holes in the support members so that the locating surface on the door is in engagement with a different locating surface on the frame.

7. A mechanism for hingedly supporting a door including:
a frame having at least one locating surface,
at least one locating member mounted on the frame;
a pair of support members mounted on the frame and each having at least two locating holes formed in them, the locating holes in each of the support members being equally spaced and in opposite angular arrays with respect to the frame,
a door having a locating surface formed on its periphery,
means for urging the door toward the frame and the locating member, and
a pair of spring mounted pivot pins attached to the door for engagement with the selected ones of the locating holes in the support members to support the door, in at least two positions with respect to the frame, one of said positions being such that the locating surface on the door is urged into engagement with the locating surface on the frame and another of the positions being such that the door is urged into engagement with the locating member.

8. A two-position mounting for a tape supply cabinet door including:
a frame having a pair of helically extending guiding slots which terminate in locating holes and having a locating surface;
a locating member mounted on the frame and having a locating surface disposed relative to the locating surface on the frame in the same manner in which the locating holes at each end of the guiding slots are disposed relative to each other;
a door having a locating surface on its periphery and having a notch formed in its periphery adjacent the locating surface;
a spring for urging the door to move toward the frame and the locating member; and
a pair of spring urged hinge pins mounted on the door for locking engagement with selected ones of the locating holes to position the door so that the torsion spring urges the locating surface on the door into engagement with the locating surface on the locating member and for movement in the guiding slots into engagement with different locating holes to position the door so that the notch in the door surrounds the locating member and so that the torsion spring urges the locating surface on the door into engagement with the locating surface on the frame.

9. A tape storage cabinet for housing rolls of tape of different predetermined widths including:
a frame member for enclosing one side and substantially the entire periphery of a roll of tape to be unwound,
means mounted on the frame for supporting the roll of tape,
a door for enclosing the remaining side of a roll of tape to be unwound and for constraining rolls of tape which are supported on the supporting means from movement along the supporting means away from the frame,
a pair of support members mounted on the frame and having pairs of locating holes positioned at equal distances with respect to the frame formed in them, and
a pair of offset pins mounted on the door for engagement with selected pairs of the locating holes to support the door in various positions with respect to the frame so that rolls of tape at various widths may be constrained from axial movement on the supporting means with respect to the frame and for moving the door away from the supporting means when the door is opened so that rolls of tape may be easily placed upon and removed from the supporting means.

10. As an article of manufacture, a cabinet for enclosing articles of various predetermined widths and for positioning such articles with respect to a locating surface including:
a frame member having a locating surface with respect to which articles must be positioned,
a pair of opposed mounting members supported by the frame and each having at least two locating holes positioned at different distances from the locating surface of the frame, each locating hole in one of the members being positioned an equal distance from the locating surface as a cooperating hole in the other mounting member,
a door for restraining articles enclosed by the cabinet from movement away from the locating surface of the frame, and
means for supporting the door on the mounting members and for locating the door in various cooperating pairs of locating holes so that the door is positioned at various predetermined distances from the locating surface of the frame.

11. A housing for rolls of tape of various different widths including:
a housing member of substantially circular configuration having an axially extending flange for enclosing substantially the entire periphery of the roll of tape,
a pair of supporting members mounted opposite each other on the flange of the housing member and each having at least two helically spaced locating holes formed in it,
a pair of locating members mounted opposite each other on the flange of the housing member,
a supporting rod,
a pair of door members supported on the rod,
a spring for urging the door members to pivot with respect to the rod and into engagement with the housing member, and
means for mounting the rod on the supporting members and in engagement with selected ones of the locating holes of the support members so that when the rod is in engagement with one of the locating holes in each of the supporting members, the door members will be urged by the spring into contact with the flange of the housing member and so that when the rod is in engagement with different ones of the locating holes in the supporting members the door members will be urged by the spring into engagement with the locating members.

12. A housing for rolls of tape of various different widths including:
a housing member of substantially circular configuration having an axially extending flange for enclosing substantially the entire periphery of roll of tape,
a cantilever post mounted on the housing member for supporting the roll of tape;
a pair of supporting members mounted opposite each other on the flange of the housing member each having at least two helically positioned locating holes formed in it,
a pair of locating members mounted substantially diametrically opposite each other on the flange of the housing member,
a pivot rod,
a pair of door members supported on the pivot rod for restraining movement of the roll of tape axially along the post, a spring for urging the door members to pivot with respect to the pivot rod and into engagement with the housing member, and means for mounting the pivot rod on the supporting members and in engagement with selected ones of the locating holes of the support members so that when the pivot rod is in engagement with one of the locating holes in each of the supporting members the door members will be urged into contact with the flange of the housing member by the spring and will thereupon be in position to restrain rolls of tape of a first predetermined width from movement axially along the post and so that when the pivot rod is in engagement with another locating hole in the support member the door members will be urged into engagement with the locating members by the spring and will thereupon be in position to restrain rolls of tape of a second predetermined width from movement axially along the post and for camming the pivot rod away from the post when the door members are pivoted on the pivot rod against the action of the spring so that rolls of tape may be easily placed upon and removed from the post.

References Cited

UNITED STATES PATENTS

| | | | |
|---|---|---|---|
| 1,076,635 | 10/1913 | Howard | 206—52 |
| 1,161,533 | 11/1915 | Schloss | 206—52 |
| 1,431,288 | 10/1922 | Corder | 220—34 |
| 3,015,384 | 1/1962 | Kellogg | 206—52 |

FOREIGN PATENTS

| | | |
|---|---|---|
| 1,121,462 | 1/1962 | Germany. |

THERON E. CONDON, *Primary Examiner.*

WILLIAM T. DIXSON, Jr., *Examiner.*